Nov. 29, 1966  C. L. AUSTIN ET AL  3,287,983
VARIABLE FORCE OSCILLATOR
Filed Jan. 25, 1963  4 Sheets-Sheet 1

INVENTORS
CURTIS L. AUSTIN
ROBERT N. BATESON
BY
*William C. Babcock*
ATTORNEY

Nov. 29, 1966     C. L. AUSTIN ET AL     3,287,983
VARIABLE FORCE OSCILLATOR
Filed Jan. 25, 1963     4 Sheets-Sheet 2
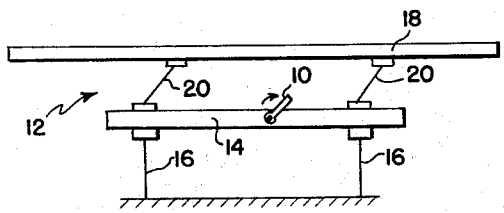
FIG. 4
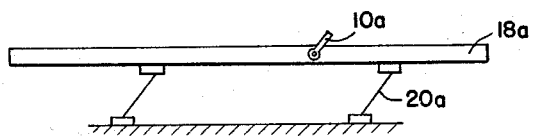
FIG. 5
FIG. 3
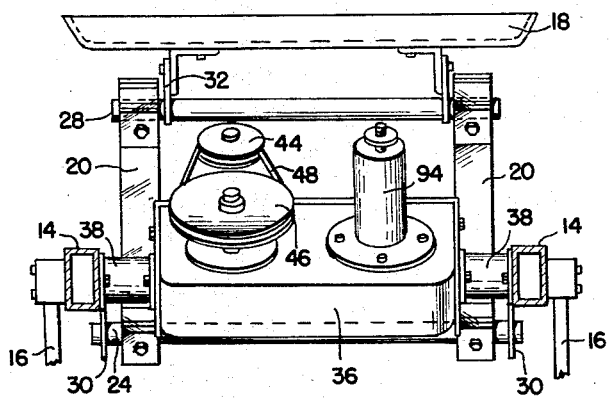
INVENTORS
CURTIS L. AUSTIN
ROBERT N. BATESON
BY
*William C. Babcock*
ATTORNEY

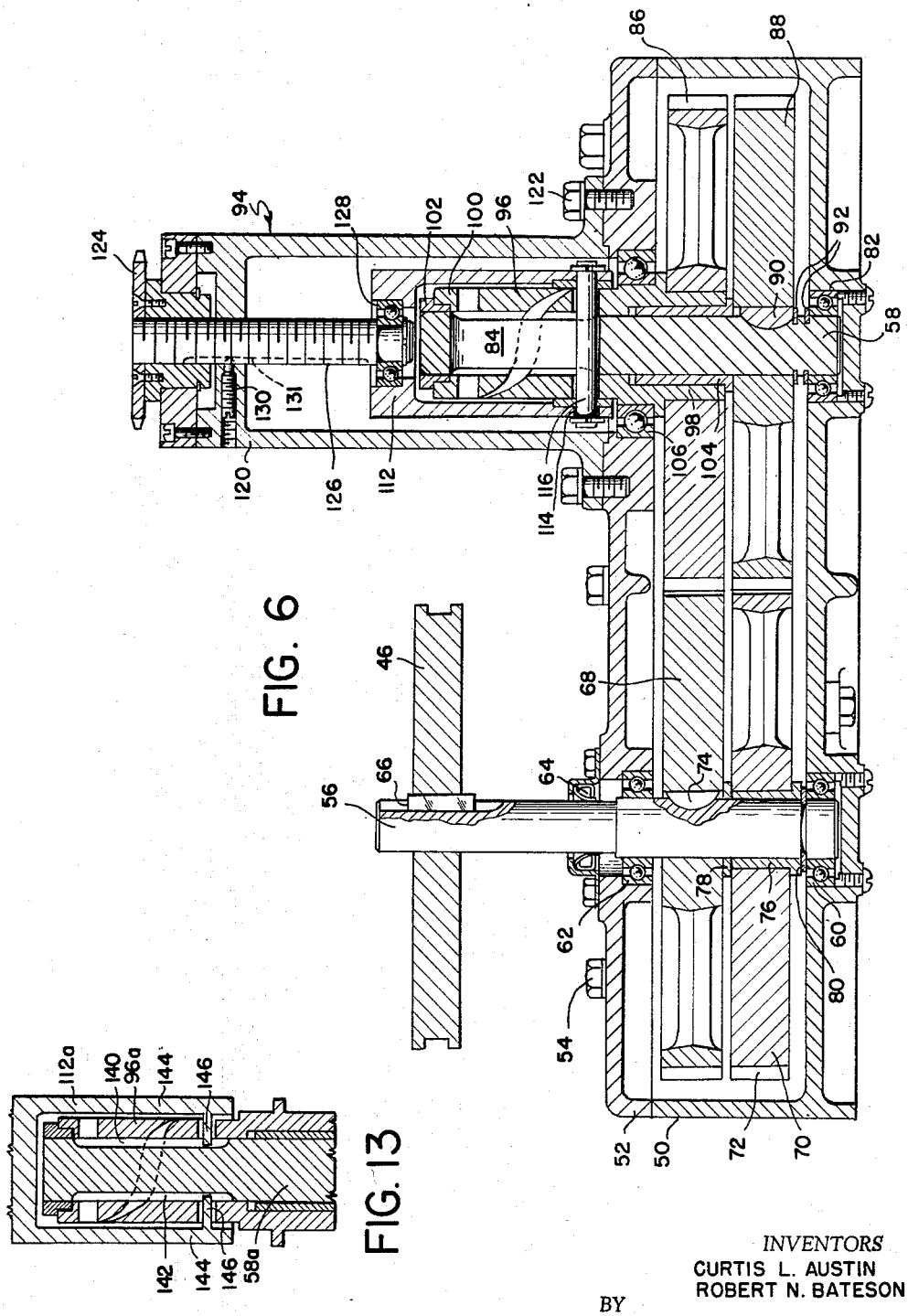

Nov. 29, 1966 C. L. AUSTIN ET AL 3,287,983
VARIABLE FORCE OSCILLATOR
Filed Jan. 25, 1963 4 Sheets-Sheet 4

INVENTORS
CURTIS L. AUSTIN
ROBERT N. BATESON
BY
*William C. Babcock*
ATTORNEY

United States Patent Office 3,287,983
Patented Nov. 29, 1966

3,287,983
VARIABLE FORCE OSCILLATOR
Curtis L. Austin and Robert N. Bateson, Minneapolis, Minn., assignors to General Mills, Inc., a corporation of Delaware
Filed Jan. 25, 1963, Ser. No. 253,935
4 Claims. (Cl. 74—61)

This invention relates to a device for producing a vibratory force and imparting vibratory motion to an object, and more particularly to an actuator for use with an oscillator or vibrator, whereby the vibratory force produced by the oscillator or vibrator might be varied while the oscillator or vibrator is in operation.

Various types of oscillators or vibrators for causing a vibratory conveyor, screen, oven, or other similar vibratory device to vibrate, are well known in the art. Such devices normally include one or more rotatable eccentric weights which cause the conveyor or similar device to vibrate at a prescribed amplitude as the weight is rotated. If two or more eccentric weights are used, they are usually caused to rotate in opposite directions by mounting them on two shafts which are rotated in opposite directions. A motor is provided for rotating one of the shafts in one direction, and appropriate gearing is provided for rotating the second shaft in the opposite direction.

Oscillators for causing a conveyor platform to vibrate are generally attached either directly to the conveyor platform, hereinafter referred to as a one-mass system; or indirectly to the conveyor platform, by direct attachment to an intermediate frame to which the platform is attached, hereinafter referred to as a two-mass system. If the one-mass system is used, the conveyor platform is normally suspended by mounting it on the ends of at least two springs, the other ends of said springs being secured to a stationary support. The oscillator is attached directly to the conveyor platform, and as the oscillator is actuated, it imparts vibratory motion to the platform. On the other hand, if the two-mass system is used, the conveyor platform is normally suspended by mounting it on the ends of at least two springs, the other ends of said springs being secured to an intermediate frame support, the frame support in turn being suspended by mounting it on the ends of at least two additional springs, the other ends of said additional springs being secured to or positioned on a stationary support. The oscillator is attached directly to the intermediate frame support, and as the oscillator is actuated, a force is transmitted to the conveyor platform, and a vibratory motion is imparted to the platform, thus causing it to vibrate. Both of these systems are now well known in the art and will not be described in further detail. Such a two-mass system for example, is described and claimed in Patent No. 2,951,581, which issued on September 6, 1960. The present invention can readily be used in both systems.

Ofttimes it is desirable to increase or decrease the magnitude of the vibratory force created by an oscillator. According to the known state of the art, this is normally accomplished by changing the relative position of the eccentric weights with respect to each other, while the device is not in operation. This often requires the operator to interrupt the conveying or screening procedure, while the phase relationship of the weights with respect to each other is changed. Moreover, this often requires that the oscillator be at least partially disassembled so that the relative position of the weights might be changed.

Accordingly, one object of the present invention is to provide an improved oscillator for producing a vibratory force and imparting vibratory motion to an object, with improved means for varying the effective force during operation.

Another object is to provide an oscillator whereby the vibratory force of the oscillator might be varied from a maximum magnitude to zero, or vice versa, while the oscillator is in operation.

A further object is to provide an oscillator which is caused to vibrate by the rotation of eccentric masses, the phase relationship of the eccentric masses being variable with respect to each other, while the oscillator is in operation.

A still further object is to provide an actuator for varying the phase relationship of rotating eccentric masses of an oscillator, without stopping the rotation of the eccentric masses.

Another object is to provide an actuator for varying the phase relationship of two rotating eccentric weights, with respect to each other, so that the component of vibratory force might be varied from full cancellation of vibratory force to full complement of vibratory force.

Other objects and advantages of this invention will become apparent from a consideration of the following specification and accompanying drawings. Before proceeding with a detailed description of the invention however, a brief description of it will be presented.

Preferably, the oscillator of the present invention is comprised of a housing which it attached either directly or indirectly to a conveyor platform, or other similar device. Two parallel shafts are rotatably mounted within the housing, and a pair of eccentrically weighted spur gears are connected to each shaft within the housing, so that each gear on each shaft meshes with another gear on the other parallel shaft. The eccentrically weighted gears are positioned with respect to each other so that a desired phase relationship between said weighted gears exists. A motor is provided for actuating the oscillator by rotating one of the shafts in one direction; the other shaft is caused to rotate in the opposite direction by virtue of the meshing eccentrically weighted spur gears. An actuator, which is operatively connected to one of the rotating shafts, is provided for changing the phase relationship of two of the eccentric weights with respect to the other two weights, while the shafts are rotating, so that the component of vibratory force might be varied from full cancellation of vibratory force to full complement of vibratory force.

The invention will best be understood by reference to the following drawings, wherein;

FIG. 3 is an end view illustrating the conveyor shown in FIGURE 1;

FIG. 4 is a schematic diagram of the device of FIGURE 1 in side elevation, which illustrates a two-mass system;

FIG. 5 is a similar schematic view illustrating a one-mass system;

FIG. 6 is an enlarged sectional view of the oscillator taken along line 6—6 of FIGURE 1;

FIG. 13 is a partial sectional view depicting a modification of the manner of coupling some of the actuator components together.

Figure 1:
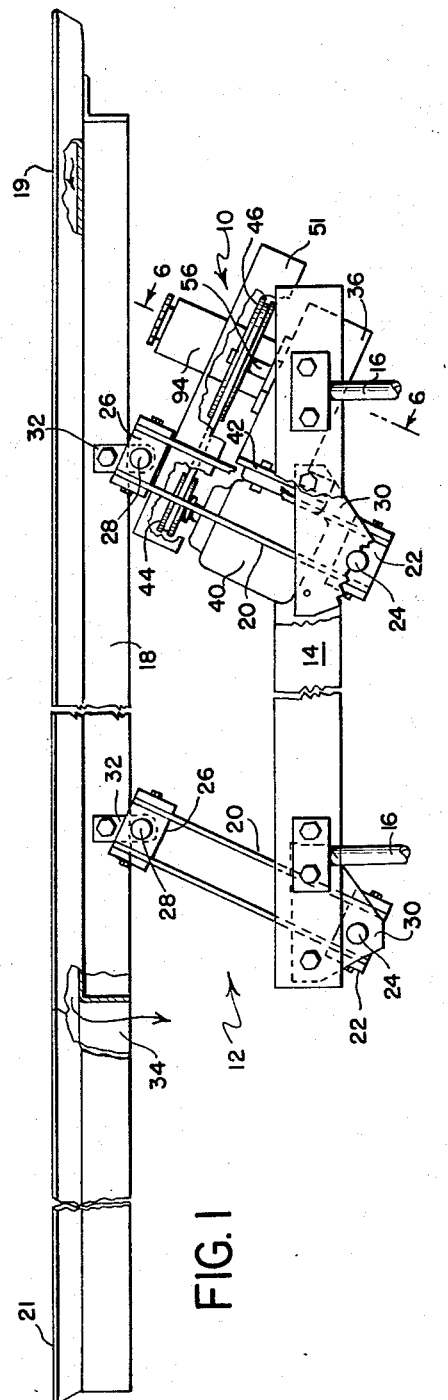
FIGURE 1 is a side elevational view with parts broken away, illustrating an oscillator attached to a vibratory conveyor.
Figure 2:
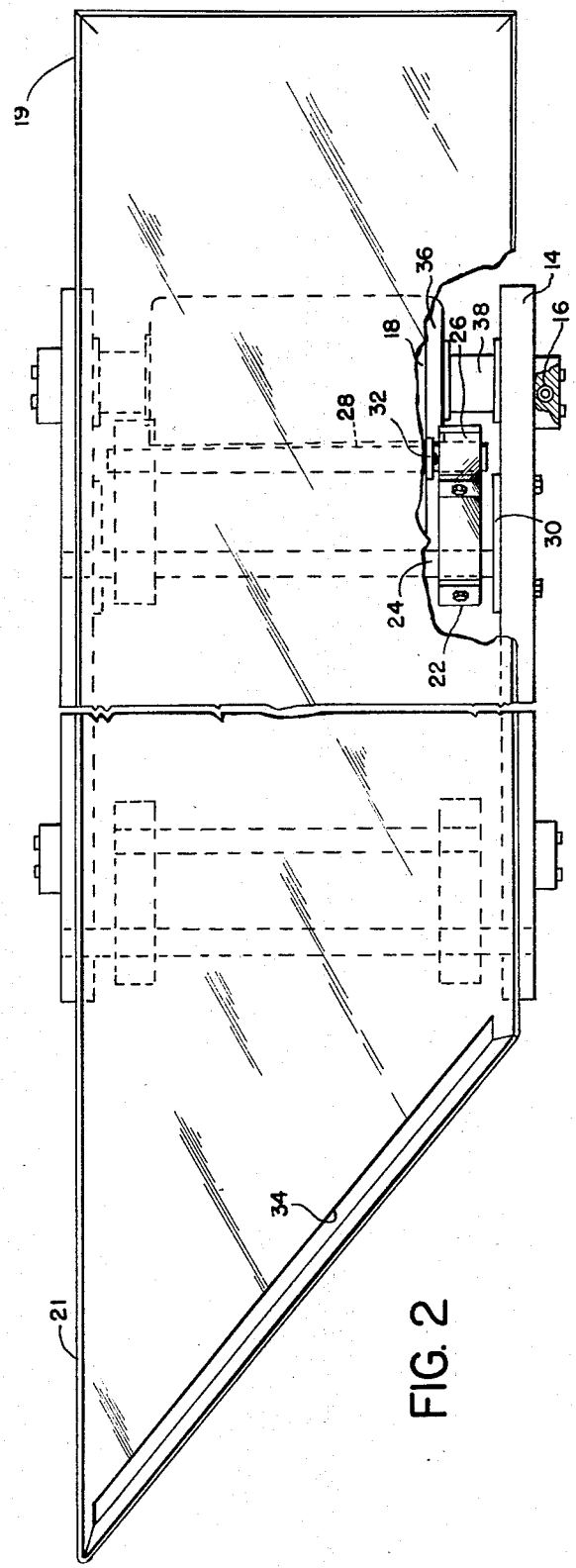
FIG. 2 is a top plan view with parts broken away, illustrating the conveyor depicted in FIGURE 1.

FIGURE 1 illustrates an oscillator designated generally by reference numeral 10, mounted so as to transmit a vibratory force to a feeder or conveyor 12 thereby causing it to vibrate at a prescribed amplitude. It must be recognized, that although the invention is shown in conjunction with a feeder or conveyor, it might readily be used with other types of vibratory devices as well, such as vibratory screens, vibratory ovens, and the like. The system depicted in FIGURE 1 is a two-mass system, as described briefly hereinbefore, and is illustrated schematically in FIG. 4. As noted in FIG. 4, the oscillator 10 is attached direcly to an intermediate support frame 14, and only indirectly to a feeder pan 18. The feeder pan 18 is mounted on springs 20, and the support frame 14 is mounted on spring legs 16. A vibratory force is transmitted to the feeder pan 18 as the oscillator is actuated, even though the frame 14 remains relatively stationary. FIG. 5 on the other hand, illustrates a one-mass system. The oscillator 10a is attached directly to the feeder pan 18a, and as the oscillator is actuated, a vibratory motion is imparted to the feeder pan 18a. The feeder pan 18a is mounted on springs 20a, which are attached to a stationary support or floor.

Referring again to FIGURE 1, the support frame 14 is mounted on four legs 16, which form resilient springs. The feeder pan 18 is resiliently mounted with respect to the frame 14 by means of the leaf springs 20, which are connected to the frame 14 by spring mounting blocks 22 secured to the shafts 24 by appropriate means, and to the pan 18 by spring mounting blocks 26 secured to the shaft 28. The shafts 24 are attached to the frame 14 by brackets 30, and the shafts 28 are attached to the feeder pan 18 by brackets 32. The feeder pan 18 has an inlet end 19 and an outlet end 21, and is provided with an elongate slot 34 at the outlet end, which permits material to be dispensed from the feeder pan.

The oscillator 10 is comprised of a housing 36 which is mounted adjacent one end of the frame 14 and is attached thereto by means of mounting hubs 38. A motor 40 is attached to the housing 36 by a mounting bracket 42, and is provided with a sheave 44. A sheave 46, keyed to a shaft 56 rotatably mounted in the housing 36, is driven by the motor 40 by means of a belt 48. A cover 51 is provided which encloses the sheaves 44 and 46 and the belt 48. (Note that the cover 51 is shown removed in FIG. 3.)

FIG. 6 illustrates the oscillator 10 in detail. The housing 36 is comprised of a main body 50, and a cover 52 secured to the body 50 by bolts 54. Rotatably mounted within the housing are two parallel shafts, a drive shaft 56 and a driven shaft 58. The drive shaft 56 is journaled in the body 50 and the cover 52 by bearings 60 and 62 respectively. The housing is partially filled with a lubricating oil; and an oil seal 64, seals the shaft 56 with respect to the housing, and prevents leakage of oil therefrom. As noted above, the sheave 46 is fixedly attached to the shaft, by a key 66.

Figure 12:
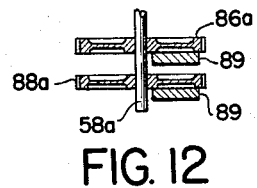
FIG. 12 is a schematic diagram which illustrates a pair of gears, each gear having a weight secured to one surface.
Figure 7:
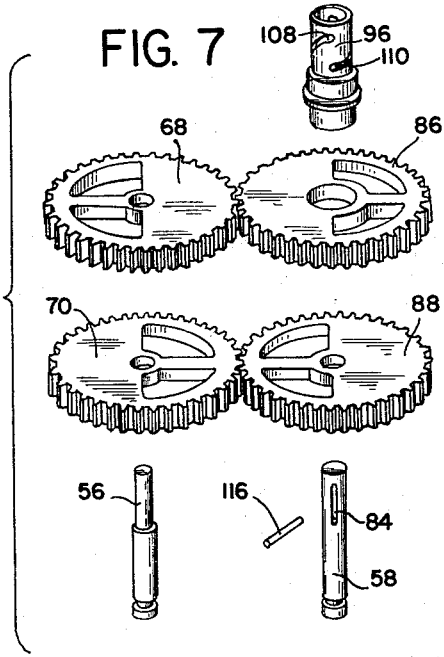
FIG. 7 is an exploded perspective view illustrating parts of the oscillator.
Figure 10:
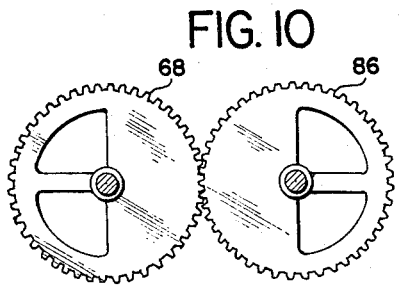
FIG. 10 is a top view illustrating two eccentrically weighted spur gears meshing together.

Mounted on the drive shaft 56 is a pair of eccentric weights, comprised of a first spur gear 68, and a second spur gear 70. The gears are eccentrically weighted to provide an unbalance mass, preferably by using a gear having a portion removed therefrom between the axis and the periphery of the gear. This provides a spur gear having an eccentrically weighted portion which forms an integral part of the gear, note FIG. 10 which illustrates this particular embodiment. Other ways of eccentrically weighting the spur gears are available as well, such as attaching a weight to one surface of the gear, the weight being placed off center with respect to the gear axis. In this connection note FIG. 12 which illustrates gears 86a and 88a having weights 89 attached hereto, the gears being mounted on the shaft 58a. By using the spur gears as shown in FIGS. 7 and 10, a minimum amount of space is required, the weights will not come loose from the gear, etc. The first spur gear 68 is fixedly connected to the shaft 56 by means of the key 74. The second spur gear 70 is journaled on the shaft 56 so that it is freely rotatable with respect to it. A bearing 76 permits relative rotation between the shaft 56 and the gear 70. The spacer 78 separates the gears from each other, and the retaining ring 80 separates the bearing 76 from the body 50 of the housing.

The second shaft 58 is rotatably mounted so that it is parallel to the shaft 56, and it is journaled in the body 50 by means of the bearing 82. An elongate slot 84 is provided adjacent one end, for a purpose to be described later.

Mounted on the shaft 58 is a second pair of eccentric weights comprised of a first spur gear 86, and a second spur gear 88. The spur gears 86 and 88 are eccentrically weighted in a manner similar to spur gears 68 and 70. All the spur gears are provided with a plurality of teeth on their peripheries. The eccentrically weighted spur gear 86 is mounted on the shaft 58 so that it meshes with the first spur gear 68 mounted on the shaft 56, and they are positioned with respect to each other so that the eccentrically weighted portions are phased 180° apart. The spur gear 86 is mounted on the shaft 58 in such a manner that it is operatively connected to the shaft for relative angular adjustment; this feature will be described later. The second spur gear 88, is fixedly connected to the shaft 58 by means of a key 90, and it is separated from the body 50 by a pair of retaining rings 92. The spur gear 88 is mounted so that it meshes with the spur gear 70 on the shaft 56 and they are positioned with respect to each other so that the eccentrically weighted portions are phased 180° apart. The phase relationship of the eccentrically weighted spur gear 88, with respect to its related eccentrically weighted spur gear 86 on the shaft 58, is varied, dependent upon the amplitude of vibration desired, by an actuator designated generally by numeral 94.

Figure 11:
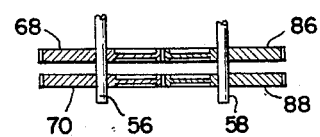
FIG. 11 is a schematic diagram which illustrates the position of the eccentric weights with respect to each other when a maximum amplitude of vibration is created.

The actuator 94 permits the operator of the feeder 12, to vary the amplitude of vibration by changing the phase relationship of the eccentric weights 86 and 88 with respect to each other, as well as the phase relationship of the weights 68 and 70 with respect to each other, so that the component of vibratory force might be varied from full cancellation of vibratory force to full complement of vibratory force. As viewed in FIG. 6, for example, the eccentrically weighted spur gears 68 and 86 are phased 180° apart with respect to each other, and the eccentrically weighted spur gears 70 and 88 are likewise phased 180° apart with respect to each other. Note further that the eccentrically weighted spur gears on each shaft, are phased 180° apart relative to each other. When the eccentric weights are in the position illustrated in FIG. 6, no vibratory force is created and no vibratory motion is imparted; in other words, a complete cancellation of vibratory force is achieved. By changing the phase relationship of the gears 86 and 88 relative to each other, a vibratory force is created which varies in magnitude from a minimum when the eccentric weights almost cancel each other out, to a maximum when they fully complement each other. In this connection, note FIG. 11, which illustrates the position of the eccentric weights when a maximum amplitude of vibration is created; in other words, when the weights are in this position, they complement each other and produce a maximum vibratory force. It must be understood of course, that although the two extremes of phase relationship of the weights has been described, the desired phase relationship between the eccentrically weighted gears 86 and 88 might be somewhere between zero degrees and 180° as well.

The actuator 94 includes a tubular or barrel cam 96 which is coaxially rotatable on the shaft 58 and which has attached to one end 98, the spur gear 86, by conventional means. A bearing 102 is provided for mounting the opposite end 100 of the cam 96, with respect to the shaft 58. A bearing 104 separates the gears 86 and 88 from each other. The cam is journaled in the cover 52 of the housing 36 by the bearing 106.

Figure 8:
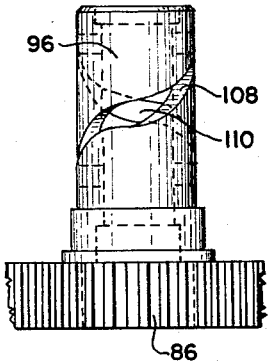
FIG. 8 is a partial elevational view depicting the cam attached to an eccentrically weighted gear.
Figure 9:
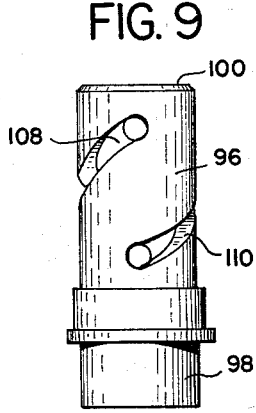
FIG. 9 is a view similar to FIG. 8 but showing the cam removed from the spur gear, and viewed from a different direction.

The cam 96 has a first elongate cam slot 108, and a second elongate cam slot 110 of equal length in its surface. In this connection note FIGS. 7, 8 and 9 as well. Both slots commence at a point spaced equidistantly from the end 100, but are disposed 180° apart relative to each other on the surface of the cam. Both slots extend helically toward the other end 98 of the cam, and each slot terminates at a point on the opposite side of the cam from its commencement point.

A tubular pin actuator 112 encircles the shaft 58 and the cam 96, in such a manner that it is coaxial with them. The pin actuator 112 has a bore 114 adjacent one end which is transverse to the longitudinal axis of the shaft 58. A pin 116 is inserted within the bore 114 and extends through the slots 108 and 110 in the cam 96, and through the slot 84 in the shaft 58, thereby maintaining the shaft 58, the cam 96, and the pin actuator 112 in an angularly coupled relationship. A cam housing 120 is attached to the housing 36 by bolts 122, and houses the members located therein. A handle 124, mounted on the unattached end of the cam housing 120, threadedly engages a cam adjusting shaft 126, which is connected to the pin actuator 112 by means of the bearing 128. The bearing 128 permits the actuator 112 to rotate relative to the shaft 126. Screw 130, in the cam housing 120, engages a slot 131 in the shaft 126 and maintains the shaft 126 in a stationary angular position. It is envisioned that other methods of maintaining the shaft 58, the cam 96, and the actuator 112 in coupled relationship might be utilized as well. For example, as shown in FIG. 13, the the shaft 58a is provided with two diametrically opposed grooves 140 and 142 on the periphery of the shaft 58a, said grooves being parallel to the longitudinal axis of the shaft. A cam 96a, similar to the cam 96 described above, and a U-shaped pin actuator or yoke 112a are provided. The actuator 112a has two arms 144, and each arm has a projection 146 which extends through the cam slots in the cam and engages the grooves 140 and 142 in the shaft 58a.

In operation, the motor 40 is actuated, thereby causing the sheave 46 and the shaft 56 to rotate in one direction. The shaft 58 is caused to rotate in the opposite direction by virtue of the spur gear 68 which meshes with the spur gear 86. As noted above, the spur gear 86 is connected directly to the cam 96, as well as indirectly to the shaft 58 by means of the pin 116 which engages the cam 96 and the shaft 58 by extending through the slots 108 and 110 in the cam 96 and the slot 84 in the shaft 58. Spur gear 88, which is attached directly to the shaft 58, rotates in the same direction as the gear 86, and it meshes with the spur gear 70, journaled on the shaft 56, thereby causing gear 70 to rotate in the same direction as the gear 68.

In order to change the phase relationship of the eccentrically weighted spur gears 86 and 88 with respect to each other while the shafts 56 and 58 are rotating, as well as when they are not rotating, the shaft 58 is caused to revolve with respect to the cam 96, thereby changing the angular position of the shaft relative to the cam. This revolution is accomplished by rotating the handle 124, which threadedly engages the cam adjusting shaft 126. As the handle 124 is rotated, the shaft 126 moves upwardly, as viewed in FIG. 6 (although it does not rotate); as the shaft 126 moves upwardly, it causes the pin actuator 112 and the pin 116 to move upwardly as viewed in FIG. 6 as well. Thus the pin 116 is caused to move axially within the slot 84 in the shaft 58, either upwardly or downwardly within the slot depending upon its initial position and the direction of rotation of the handle 124. Since the pin 116 also extends through and engages the slots 108 and 110 in the cam 96, the pin is caused to revolve 180° around the longitudinal axis of the shaft 58; as the pin revolves in this manner, it causes the shaft 58 to revolve around the longitudinal axis of the shaft as well, thereby changing the phase relationship of the eccentrically weighted spur gear 88 with respect to the gear 86 on the shaft 56; simultaneously, the phase relationship of the gears 68 and 70 with respect to each other is changed as well. As the phase relationship of these eccentrically weighted spur gears is changed, the magnitude of vibratory force created by the oscillator can be varied from a zero force to a maximum force, or in varying intermediate ranges, by a simple adjustment of the actuator.

The variable force oscillator described herein, can be used for producing a vibratory force and imparting a vibratory motion to different types of devices, such as a conveyor. By a simple adjustment, the amplitude of vibration of the vibrating body can be varied from a zero magnitude to a predetermined maximum magnitude, by cancelling the vibratory force in its entirety, or by complementing the vibratory force by a simple adjustment while the oscillator is being actuated. It should be recognized further, that although the oscillator has been illustrated in connection with a horizontal conveyor or feeder, it is envisioned that it might also be used with other types of conveyors, such as vertical or spiral conveyors where a vibratory motion might be desired, with minor modifications which one skilled in the art could accomplish. Furthermore, it is envisioned that in some instances, a single shaft having two eccentric weights thereon might be used, for example as a gyratory drive for a gyratory sifter or the like; and means could be provided to change the phase relationship of the weights with respect to each other while the shaft is rotating, thereby varying the magnitude of vibratory force created by the apparatus.

In the above description and the attached drawings, a disclosure of the principles of this invention is presented, together with some of the embodiments by which the invention may be carried out.

What is claimed is:

1. An actuator for varying the phase relationship of two eccentric weights mounted for rotation within a housing about a common axis comprising a tubular housing having a longitudinal axis corresponding to said common axis, means for attaching said tubular housing to the housing, a tubular member disposed within said tubular housing and coaxial therewith, said member having a bore proximate one end transverse to said longitudinal axis, a tubular cam disposed within the tubular member and coaxial therewith, one end of said cam projecting beyond the end of the tubular housing, said cam having first and second elongate slots of equal length in its surface, both of said slots commencing at a point spaced equidistantly from one end of the cam but being disposed 180° apart relative to each other, both of said slots extending helically toward the other end of the cam so as to terminate at a point on the opposite side of the member from its commencement point, a longitudinal shaft disposed within said cam and coaxial therewith, said shaft projecting beyond the projecting end of the cam and having a slot therein transverse to the longitudinal axis, a pair of eccentric weights of substantially the same size and weight, means for attaching one of said weights to the projecting end of the cam, means for attaching the other weight to the projecting end of the shaft, a pin, means for mounting said pin within the bore in the tubular member, the slot in the shaft, and the slots in the cam, thereby maintaining said member, shaft and cam in coupled relationship, means for moving the tubular member axially with respect to the longitudinal axis, said movement causing the pin to move axially within the slot in the shaft thereby revolving said shaft and said cam with respect to each other, said relative movement causing the relative angular position of said shaft and said cam with respect to each other to be changed, and the phase relationship of the eccentric weights with respect to each other to be varied.

2. In an oscillator which includes a pair of parallel shafts and a pair of eccentric weights mounted on each shaft, an actuator for varying the vibratory force of said oscillator comprising a tubular cam coaxial with one of said shafts, said cam having first and second diametrically opposed slots of equal length in its surface, each slot commencing at a point spaced equidistantly from one end of the cam and extending helically toward the other end of the cam and terminating at a point on the opposite side of the cam from its commencement point, means for attaching a first eccentric weight to one end of the cam, one of said parallel shafts disposed within said cam and coaxial therewith, one end of said shaft projecting beyond the cam and its attached weight, means for attaching a second eccentric weight to said projecting end, said shaft having a slot therein transverse to its longitudinal axis, a pin inserted within the slot in the shaft which engages the slots in the cam thereby maintaining the cam and the shaft in assembled relationship, means for mounting the eccentric weights on the second shaft so that the first weight on the first shaft is phased 180° apart with respect to the first weight on the second shaft when said weights are perpendicular to the direction of motion produced by the oscillator, means for mounting the other weight on the second shaft so that it is phased 180° apart with respect to the second weight on the first shaft when said weights are perpendicular to the direction of motion produced by the oscillator, means for rotating the shafts in opposite directions, and means for moving the pin axially relative to the slot in the first shaft, said means including a tubular pin actuator which surrounds at least a portion of the cam and which engages the ends of the pin, said movement revolving said shaft with respect to the cam while the shafts are rotating, the revolution of said shaft changing the phase relationship of the second weight on said shaft with respect to the first weight on said shaft.

3. An oscillator for producing a vibratory force comprising a housing, a first shaft rotatably mounted in said housing, a first pair of eccentric weights mounted on said first shaft, said weights being of substantially the same size and weight, means for fixedly connecting a first weight of said weights to said shaft, means for rotatably mounting the second weight on said shaft, a second shaft rotatably mounted in said housing parallel to the first shaft, a second pair of eccentric weights mounted on said second shaft, said second weights being of substantially the same size and weight, a cam member coaxial with said second shaft and at least partially encircling said second shaft, means for fixedly connecting a first weight of said second pair of weights to the cam member, means for fixedly connecting the other weight of said second pair to the second shaft, said second shaft and said other weight being at least partially rotatable relative to the cam member and its attached weight, the first weights on each shaft being paired with each other and the second weights on each shaft being paired with each other so that a desired phase relationship between said weights exists, means for rotating the first shaft in one direction, gearing means for rotating the second shaft by said first shaft in an opposite direction, and means including the cam member, for varying the phase relationship of the second weight on each shaft with respect to the first weight on each shaft while the shafts are rotating, said means causing the second weight on each shaft to be revolved with respect to the first weight thus varying the phase relationship between the first and second weights on each shaft.

4. An oscillator for producing a vibratory force comprising a housing, a pair of parallel shafts rotatably mounted within said housing, a pair of spur gears mounted on each shaft within the housing, means for eccentrically weighting each of said gears, means for attaching at least one spur gear of each pair of gears to its respective shaft, means for positioning a first gear of each pair of gears on its respective shaft so that said gears mesh with each other and the eccentric weights of said gears are phased 180° apart relative to each other when the weights are perpendicular to the direction of motion produced by the oscillator, means for positioning the second gear of each pair of gears on its respective shaft so that said second gears mesh with each other and the eccentric weights of said gears are phased 180° apart relative to each other when the weights are perpendicular to the direction of motion produced by the oscillator, all of said eccentrically weighted gears being of substantially the same size and weight, means for rotating the shafts in opposite directions, and means for varying the phase relationship of the second eccentrically weighted gear on each shaft with respect to the first eccentrically weighted gear on said shaft so that the component of vibratory force might be varied in a range from full cancellation of the vibratory force to complete complement of vibratory force while the shafts are rotating, said means including a cam member coaxial with and at least partially encircling one of the shafts, said cam member being at least partially revolvable with respect to said shaft, means for fixedly connecting the first weighted gear on said shaft to one end of said cam, the second weighted gear on said shaft being fixedly connected to said shaft, said first weighted gear on said shaft meshing with the first weighted gear which is fixedly connected to the other shaft and the second weighted gear on said shaft meshing with the second weighted gear which is rotatably mounted on the other shaft, said cam member provided with means for causing the second eccentric weight of each pair of weights to be revolved with respect to the first weight of said pair.

References Cited by the Examiner

UNITED STATES PATENTS

| 787,830 | 4/1905 | Conant | 74—99 X |
| 859,866 | 7/1907 | Atkins | 74—571 |
| 977,288 | 11/1910 | Euchenhofer | 74—99 X |
| 1,016,750 | 2/1912 | King | 74—107 X |
| 1,280,269 | 10/1918 | Miller | 74—61 |
| 2,054,253 | 9/1936 | Horsch | 74—61 |
| 2,410,170 | 10/1946 | Lazan | 74—61 |
| 2,445,175 | 7/1948 | Hittson | 74—61 |
| 2,725,745 | 12/1955 | Hubbard et al. | 74—87 X |
| 2,748,609 | 6/1956 | Olson | 74—61 |
| 2,831,353 | 4/1958 | Ongaro | 74—61 |
| 2,930,244 | 3/1960 | Hutchinson et al. | 74—61 |

FOREIGN PATENTS

| 974,916 | 2/1951 | France. |
| 507,162 | 8/1930 | Germany. |
| 2,950 | 1862 | Great Britain. |
| 8,741 | 1907 | Great Britain. |
| 300,835 | 11/1928 | Great Britain. |
| 415,309 | 8/1934 | Great Britain. |
| 365,822 | 12/1938 | Italy. |

FRED C. MATTERN, Jr., *Primary Examiner.*

BROUGHTON G. DURHAM, MILTON KAUFMAN, *Examiners.*

D. H. THIEL, *Assistant Examiner.*